United States Patent [19]

Muscatell

[11] Patent Number: 4,479,265

[45] Date of Patent: Oct. 23, 1984

[54] LASER MICROPHONE

[76] Inventor: Ralph P. Muscatell, 2007 NE. 20th Ave., Fort Lauderdale, Fla. 33305

[21] Appl. No.: 444,627

[22] Filed: Nov. 26, 1982

[51] Int. Cl.[3] .............................................. H04B 9/00

[52] U.S. Cl. .................................. 455/605; 179/121 R

[58] Field of Search .................... 455/605; 179/121 R, 179/138, 139

[56] References Cited

U.S. PATENT DOCUMENTS

| | | | |
|---|---|---|---|
| 1,709,762 | 4/1929 | Zworykin . | |
| 3,470,329 | 9/1969 | Young | 179/121 |
| 3,622,791 | 11/1971 | Bernard | 179/121 R |
| 4,361,911 | 11/1982 | Buser et al. | 455/605 |
| 4,422,182 | 12/1983 | Kenjyo | 179/121 R |

OTHER PUBLICATIONS

The Michelson Interferometer, Fizeau Air Wedge Experiment described in Physical Education by P. W. Fish, Jan. 1971.

*Primary Examiner*—Joseph A. Orsino, Jr.
*Assistant Examiner*—Timothy K. Greer
*Attorney, Agent, or Firm*—Oltman and Flynn

[57] ABSTRACT

The invention is a laser microphone in which two aligned beams of laser light, of which one beam is slightly delayed in relation to the other beam of the same frequency and is reflected by an object in motion, to produce intensity variation that vary as a function of the movements of the reflecting object.

23 Claims, 26 Drawing Figures

22

FIG. 1
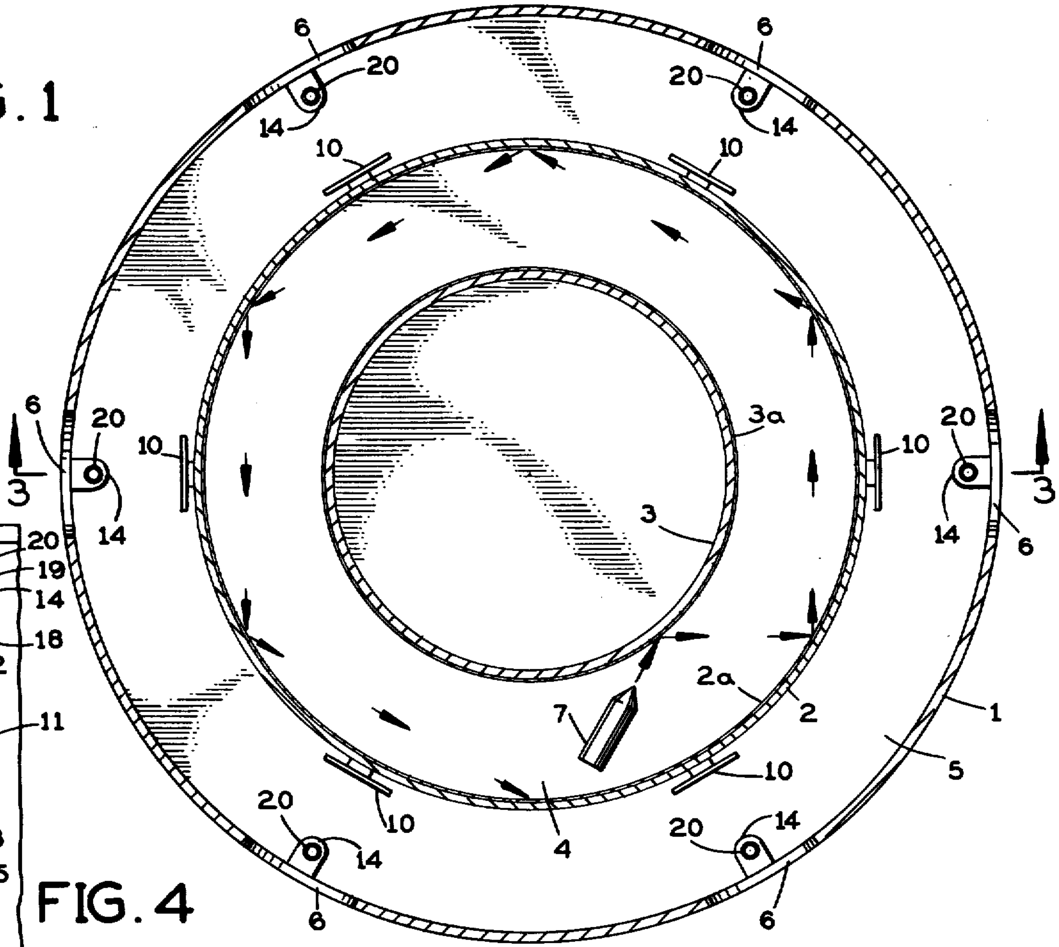
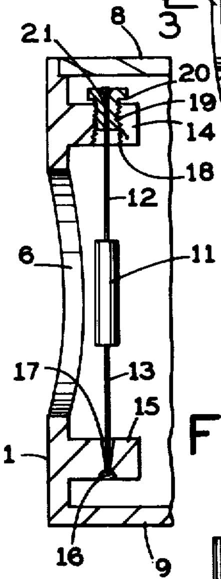
FIG. 4
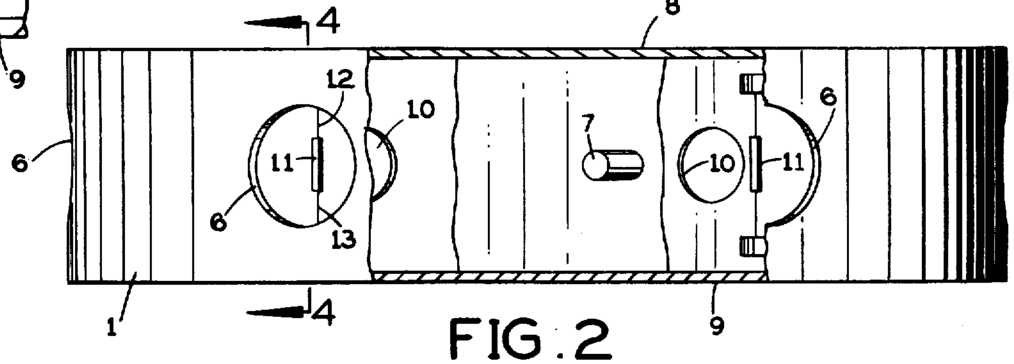
FIG. 2
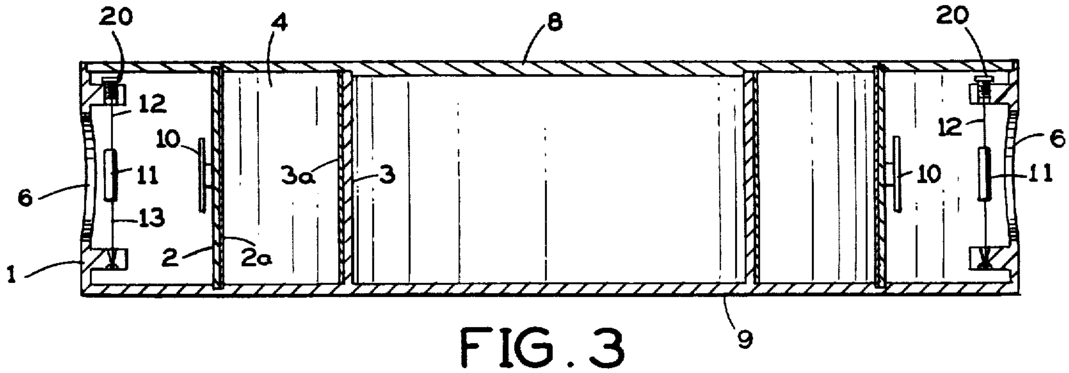
FIG. 3

FIG. 5
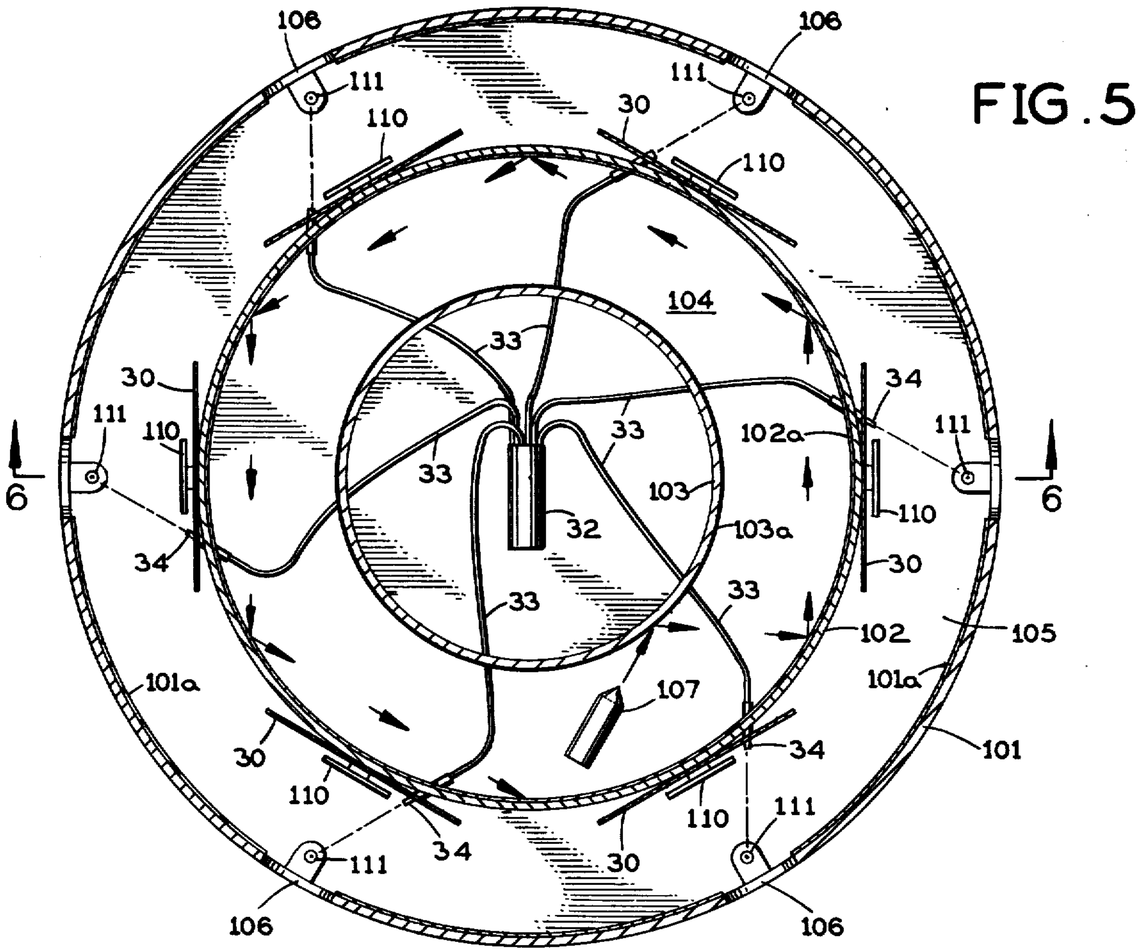
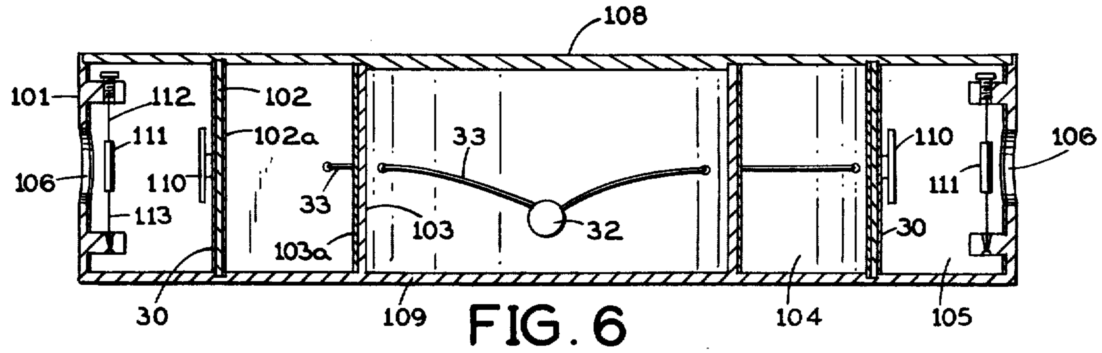
FIG. 6
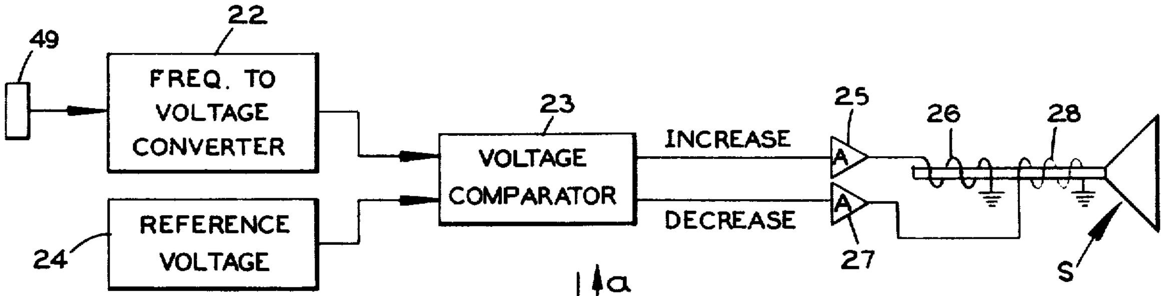
FIG. 14a
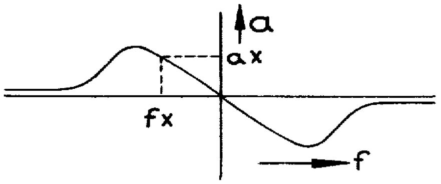
FIG. 14b

FIG. 7
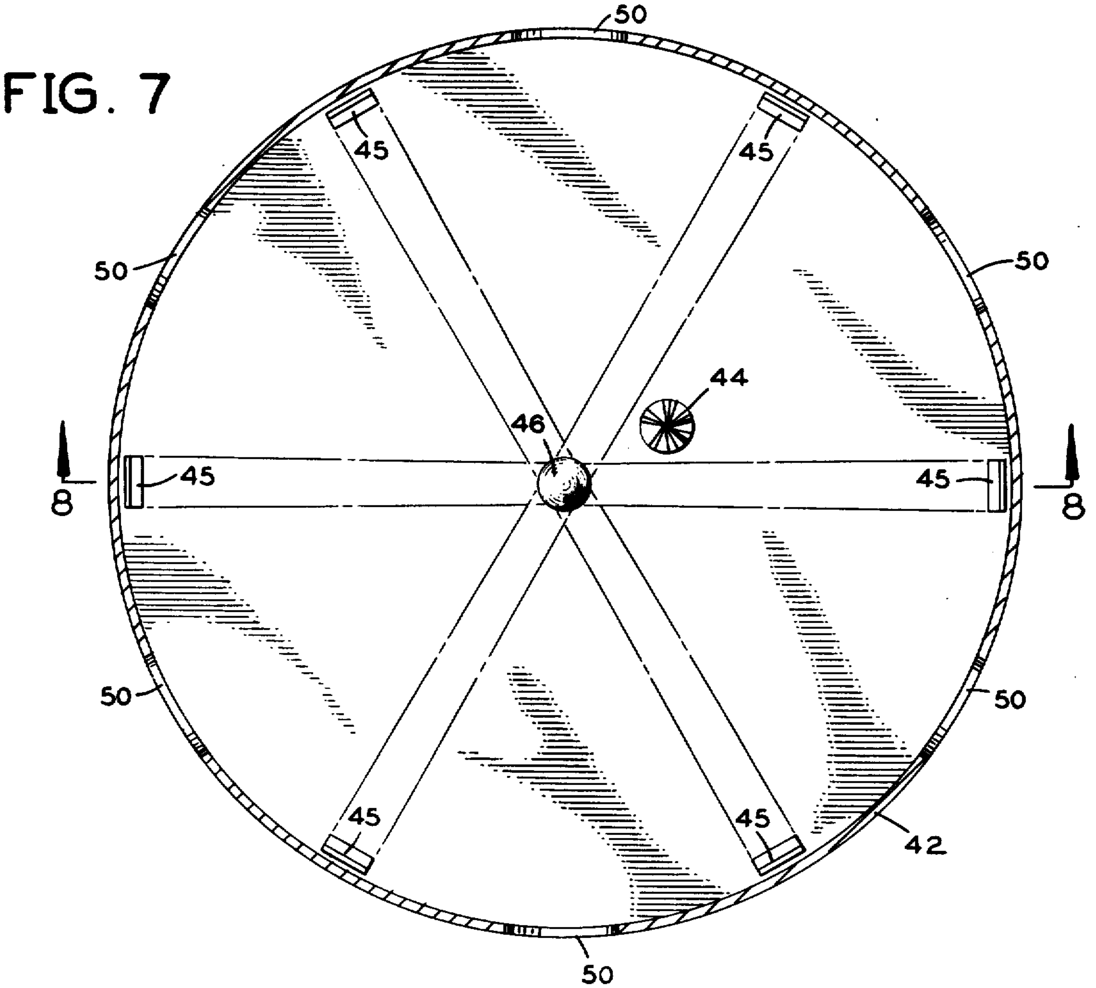
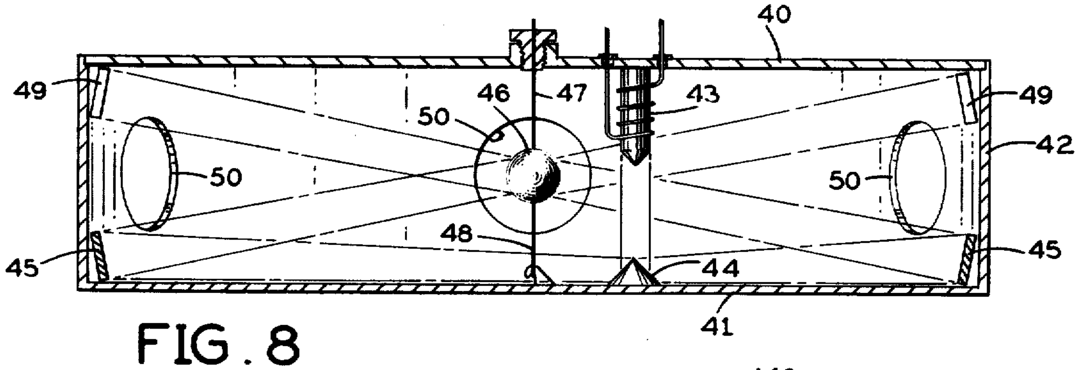
FIG. 8
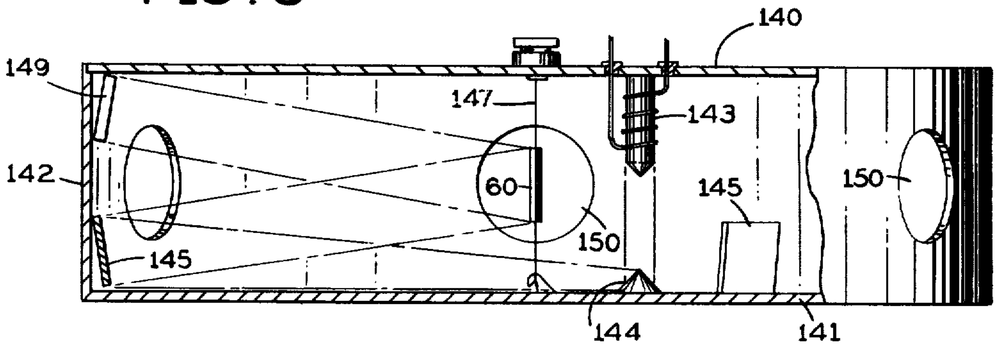
FIG. 9

FIG. 10
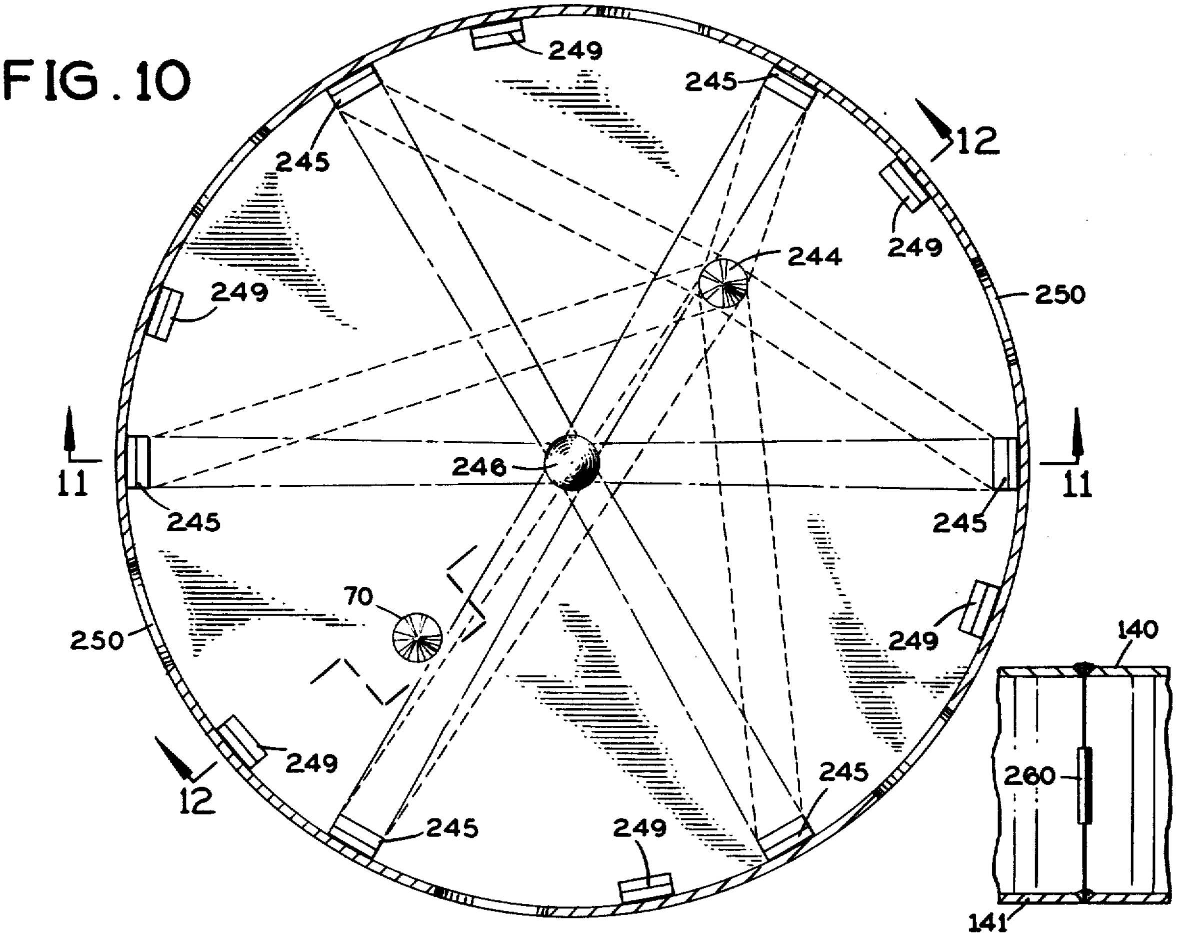
FIG. 13
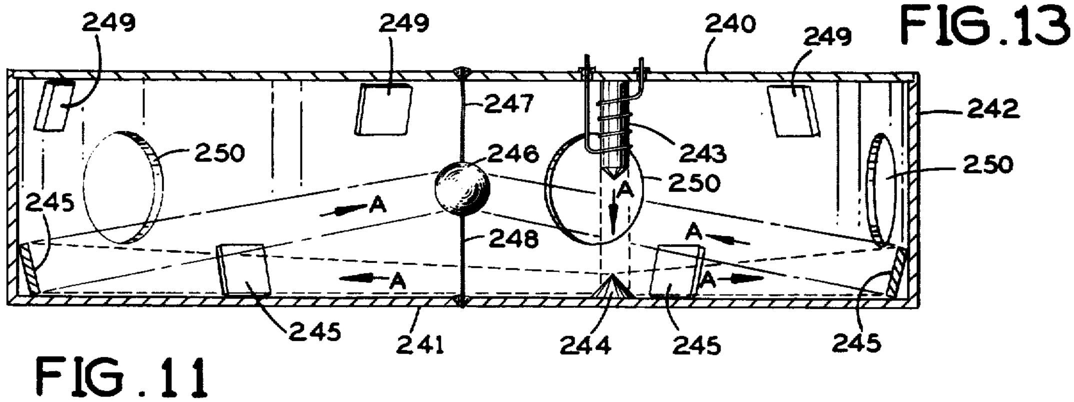
FIG. 11
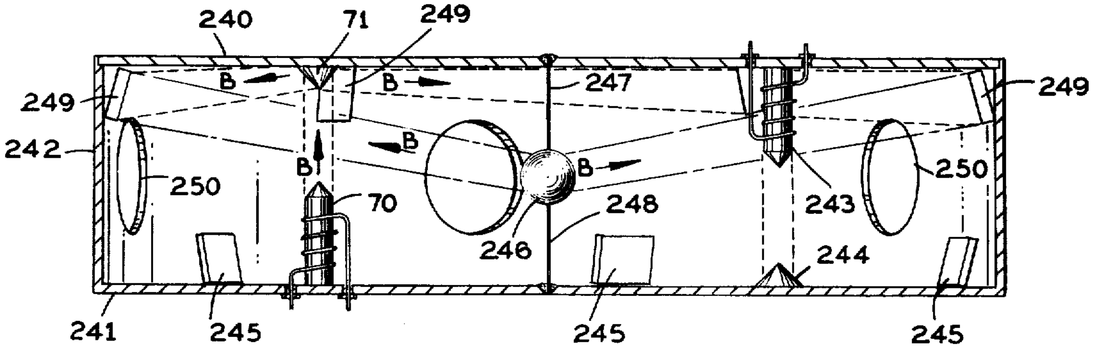
FIG. 12

LASER MICROPHONE

BACKGROUND AND PRIOR ART

The present invention is related to devices serving to detect minute vibrations and sound waves in air, best known as microphones. The invention especially utilizes the unique properties of coherent, monochromatic light, best known as laser light, to create interference effects between two aligned beams of light.

Such effects are well known from the Michelson Interferometer which has been described extensively in the literature of physics, such as Scientific American: Lasers and Light by A. L. Schawlow, 1969, or from the Fizeau Air Wedge experiment, described for example in Physical Education by P. W. Fish, January, 1971.

Briefly stated, two aligned beams of laser light, of which one beam is slightly delayed in relation to the other beam of the same frequency, will cause the two beams to reinforce each other if they are in the same phase or to cancel each other if one beam is 180° out of phase.

If one of the two beams is reflected by an object in motion such that the direction of motion is generally in the same direction as the non-reflected stationary beam, and the two beams are aligned by means of suitable mirrors into a single beam, the resulting interference pattern will move at a velocity that is twice the velocity of the moving object along the axis of the aligned beam. As the interference pattern moves in the direction of the aligned beam, a light sensor placed in the path of the beam will sense light intensity variations that vary as a function of the movements of the reflecting object.

The interference caused by beams of light has been used by inventors to construct microphones that are very sensitive and have other qualities. As examples, U.S. Pat. No. 3,470,329 by N. O. Young issued Sept. 30, 1969 entitled Interferometer Microphone describes a microphone based on interferences created by light reflected from a low-mass membrane. U.S. Pat. No. 1,709,762 by V. K. Zworykin, issued Apr. 16, 1929, entitled Interferometer Microphone describes the interference of light that is traversing an air-space also traversed by acoustic waves which modulate the light beam.

The present invention utilizes the availability of coherent, monochromatic light sources that are now available in the form of small relatively inexpensive lasers to produce a microphone that is more compact and less complex in construction and which provides additional advantages as described in the course of the following specification with appended drawings.

It is a primary object of the invention to produce a microphone that provides a high degree of fidelity in the transformation of sound waves to electrical signals.

It is another important object of the invention to produce a microphone that is compact in size.

It is a further object of the invention to produce a microphone that has multi-channel capability such as to provide sound reproduction that is closely correlated to the original sound patterns in a locale with sound reflecting properties.

It is still another object of the invention to provide a microphone that is dependable in operation and that is capable of mass production and without undue complexities.

Other objects and advantages of the invention will become apparent in the course of the following description with its appended drawings.

BRIEF DESCRIPTION OF THE DRAWINGS

FIG. 1 is a cross-sectional, horizontal top-down view of the invention in an embodiment using diffused laser light reflected from a vibrating, silvered glass rod;

FIG. 2 is a vertical, part cross-sectional, part elevational view of the invention of FIG. 1;

FIG. 3 is an elevational, cross-sectional view of the invention seen along the line 3—3 of FIG. 1;

FIG. 4 is an enlarged detailed view of the invention, seen along the line 4—4 of FIG. 2, showing a vibrating glass rod and mechanical details of its suspension;

FIG. 5 is a horizontal, top-down cross-sectional view of the invention, using two interfering lasers and individual vibrating bodies;

FIG. 6 is an elevational cross-sectional view of the invention of FIG. 5 along the line 6—6 of that figure;

FIG. 7 is a horizontal cross-sectional top-down view of the invention using a single laser and a single, central spherical vibrating reflecting body;

FIG. 8 is an elevational, cross-sectional view of the invention of FIG. 7 seen along the line 8—8 of that figure;

FIG. 9 is an elevational, part cross-sectional view of the invention of FIG. 7 using a single, central cylindrical vibrating reflecting body;

FIG. 10 is a horizontal, cross-sectional, top-down view of the invention using two interfering lasers and a single central, spherical, vibrating reflecting body;

FIG. 11 is a vertical cross-sectional view of the invention according to FIG. 10, and seen along the line 11—11 of that figure;

FIG. 12 is an elevational, cross-sectional view of the invention according to FIG. 10 seen along the line 12—12 of that figure;

FIG. 13 is a detail of the method of suspension of the single, cylindrical, vibrating, reflecting glass rod of FIG. 9;

FIGS. 14*a* and 14*b* are an electrical schematic circuit diagram of the frequency discriminatory apparatus and its frequency discrimating curve;

DETAILED DESCRIPTION OF THE INVENTION

The invention is a microphone that utilizes beams of laser light, and in particular it utilizes various manifestations of laser light that has been modulated by the vibrations of a low-mass reflecting body, that is lightly suspended and exposed to sound waves emitted from a sound source, or from a dispersed aggregation of individual sound sources, such as an orchestra, band or other performing group.

In one of the preferred embodiments, the microphone is configured such that it is sensitive to sound waves coming from a plurality of directions as they are reflected from walls, floor, ceiling, audience and so forth in an auditorium with a performing stage. By connecting the plurality of channels through suitable amplifying means and connected to clusters of loudspeakers, each consisting of as many loudspeakers as there are channels in the corresponding microphone, an omnidirectional sound reproduction system may be provided, which is capable of reproducing the original sound with a high degree of fidelity.

It should be understood that the invention as disclosed is capable of many embodiments beyond those disclosed and claimed, that will be obvious to those skilled in the art, and which, therefore fall within the scope of the invention.

The terminology used is for descriptive purpose and not for limitation.

Figure 21:
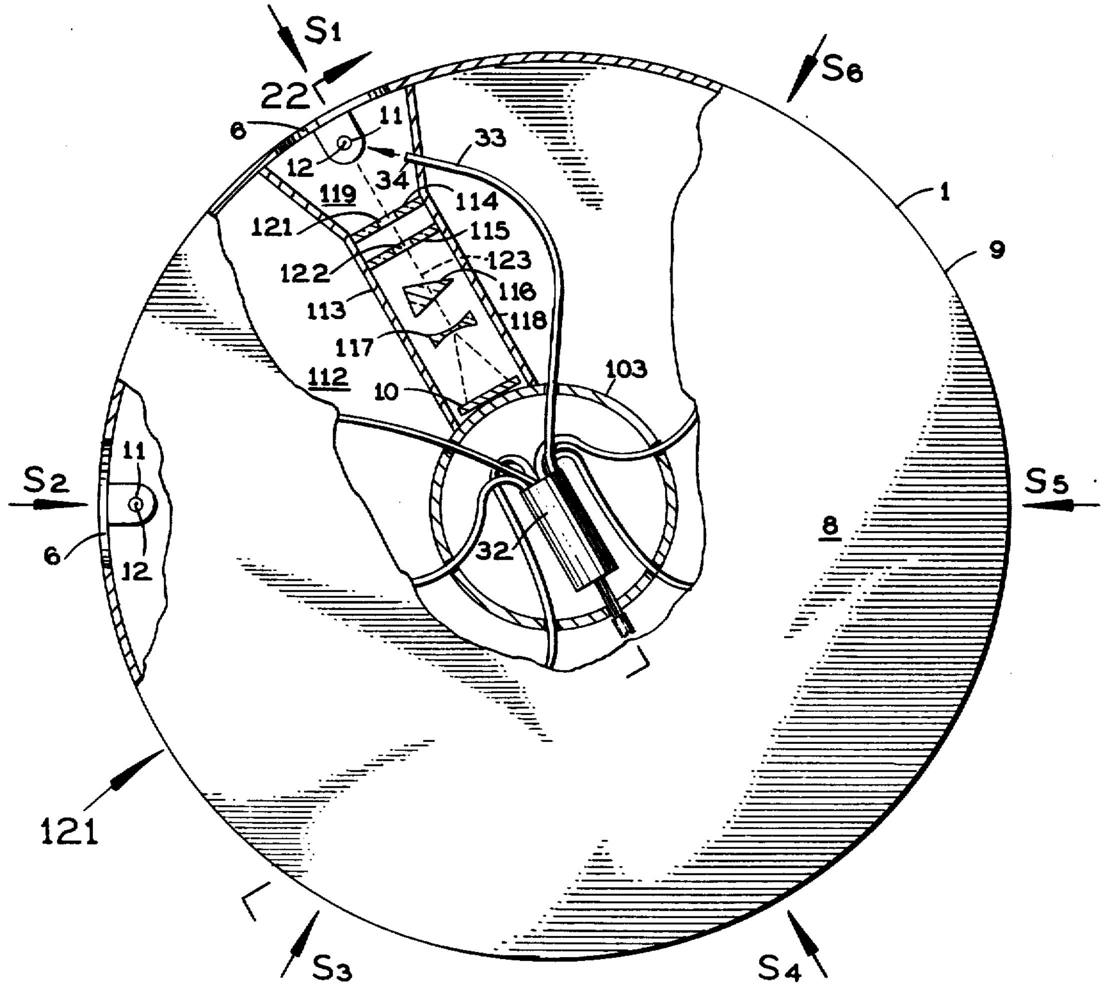
FIG. 21 is a fractional, top-down view of the interior of a microphone according to the invention in a preferred embodiment.
Figure 22:
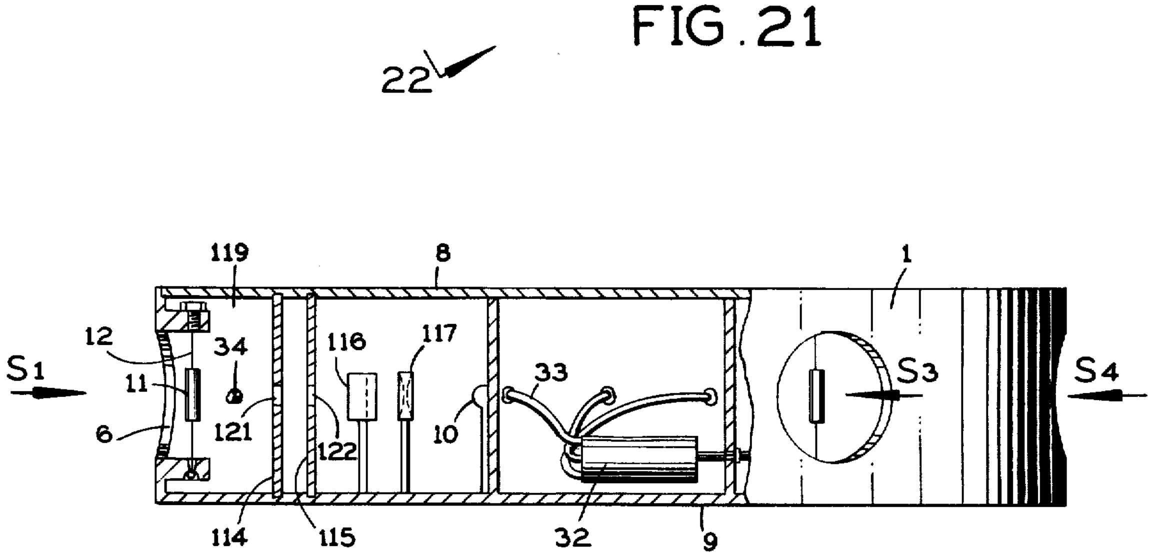
FIG. 22 is a vertical, cross-sectional view of the invention according to FIG. 21 along the line 22—22 of that figure.

FIG. 21 is a fractional, top-down view of the interior construction of a microphone according to the invention in its first preferred embodiment. FIG. 22 is an elevational, cross-sectional view of the same embodiment seen along the line 22—22 of FIG. 21. The interior apparatus is enclosed in a circular housing generally at H consisting of a circular top plate 8, a corresponding circular bottom plate 9, and a cylindrical outer wall 1 with an upper and lower circular perimeter aligned with the perimeters of aforesaid top and bottom plates 8 and 9, defining a cylindrical cavity divided into an inner space generally at 111 and an outer space generally at 112 by an inner cylindrical wall 103 disposed coaxially with said outer wall 1 and extending between the top and bottom plates 8 and 9 respectively.

A plurality of circular apertures 6 are disposed equidistantly around the outer wall 1 serving to admit sound waves to enter an equal plurality of apparatus compartments 119, also disposed equidistantly and radially around the perimeter and inside the circular housing.

The inner space 111 contains a laser 32 which emits a stream of monochromatic, coherent laser light which is piped through a plurality (equal to the plurality of apertures) of optical fiber light guides 33, each of which conducts a part of the laser light to the front, outer end of the apparatus compartment 119, and where the laser light is projected against a vibrating, reflecting glass rod 11.

The glass rod 11 is positioned centrally a short distance behind and inside the aperture 6, where it is exposed to sound waves entering the apparatus compartment 119 through the aperture 6, and causes it to vibrate in harmony with the incoming sound waves.

The plurality of apertures 6 is shown as six, but could be any other suitable quantity.

With six apertures, sound waves are admitted into the six apparatus compartments from six directions, indicated by arrows S1 through S6 in a generally horizontal plane.

The glass rods 11 are suspended between the top and bottom plates 8 and 9 by means of two fine wires 12. The glass rods are constructed with very thin walls and with low mass, such that they may readily follow the vibrations of the sound waves. In an alternate construction, the glass rod may be replaced by a very low mass, thin piece of tape coated on the inside with a mirror coating and suspended vertically between the top and bottom plates 8 and 9.

Part of the laser light projected toward the reflecting glass rod 11 is reflected radially inward toward the center of the housing.

The apparatus compartment 119 additionally contains two optical masks 114 and 115 each with a small aperture 121 and 122, disposed in the path of the inward projecting laser light. The apertures serve to concentrate the laser light into an inward narrow beam, indicated as a broken line 123. The inward beam next reaches an optical prism 116 which refracts the incoming beam a certain angle $\alpha$, which is a function of the refractory coefficient of the material of which the prism is fabricated, the angle of incidence of the light and the frequency of the light. Typically, as the frequency of the light increases, so does the refractory coefficient. After being refracted in the prism and after exiting, the beam of light traverses a concave lens 117 which operates to magnify the angle of incidence of the light incident to the lens. A light beam aligned with the axis of the lens will sustain no change in angle of incidence, but a beam deviating a small angle from the axis of the lens will exit at an even greater angle when exiting from the lens.

In operation the microphone functions as follows:

Sound waves entering the microphone through any of the apertures 6, e.g. by the arrow S1, will cause the glass rod 11 to vibrate in harmony with the sound waves. Laser light projected onto the glass rod from optical fiber 33 will be reflected from the glass rod 11, and part of that light will traverse the apertures 121 and 122 of the masks 114 and 115 as a narrow beam 123 of light. The light being reflected will at the same time be frequency modulated by the velocity of the sound responsive element in accordance with the principles of the Doppler effect. The frequency modulated light enters the prism 116 on the side facing the beam, at an angle of incidence of approximately 45° and in a plane that is perpendicular to the axis of the prism. In the prism, the light beam will be refracted to a degree that, as explained above, among other factors depends on the frequency of the light. Since the beam is frequency modulated in accordance with the velocity of the sound responsive element, the beam will be refracted in accordance with the frequency modulation of the light and the beam will be expanded into a narrow spectrum which is contained in the plane that is perpendicular to the axis of the prism.

The spectrum of light is further expanded by traversing the concave lens 117, and exits threfrom as a fan of light. This fan of light is projected onto a position sensitive photo sensor 10 which has its axis in the aforesaid plane perpendicular to the axis of the prism 116.

The light beam, as it is frequency modulated by the frequency of the sound waves, will play back and forth on the active surface of the photo sensor 10 in a form of a moving light rectangular pattern.

The position sensitive photo sensor has been described in detail in the patent application Ser. No. 06/355,898 by the same applicant. The electrical output signal from the photo sensor is closely correlated to the acoustic waves entering the aperture 6, and may be connected to suitable amplification means to be reproduced in loudspeakers or recorded on tape as the case may merit, as explained in more detail later under reproduction.

A second embodiment of the invention is shown in FIGS. 1, 2 and 3.

Referring to FIG. 1, the present microphone has a cylindrical housing with a cylindrical outer wall 1, a cylindrical intermediate wall 2 and a cylindrical inner wall 3, both concentric with the outer wall. The housing has flat top and bottom walls 8 and 9 (FIG. 2) which closes it at the top and bottom. Between its top and bottom walls the housing presents an inner annular chamber 4 between walls 3 and 2 and an outer annular chamber 5 between walls 2 and 1. The inner wall 3 has a substantially totally light-reflective, silvered coating 3*a* on the outside. The intermediate wall 2 is of glass or other suitable light-transparent material, and its inner surface is covered by a partially light-reflective, silvered coating 2*a* which permits about half the laser light striking it to pass through wall 2 and the remaining half of this light to be reflected. The outer wall 1 is formed with six circular openings 6 at 60° intervals circumferentially. Except at these openings the outer wall 1 presents a substantially opaque coating 1*a* on the inside.

A laser 7 is positioned in the inner chamber 4 between intermediate wall 2 and inner wall 3 to direct a coherent beam of laser light toward the reflective coating 3*a* on the outside of inner wall 3 at an oblique, non-radial angle. Preferably, the direction of the laser light emitted by laser 7 is at an angle of about 45° to a line extending radially through the inner wall 3 where the laser light strikes it. The laser light is reflected by the coating 3*a* on the inner wall at an equal and opposite angle. After this first reflection, about half the light passes through the intermediate wall 2 into the outer annular space 5, and the remaining half of the once-reflected light is reflected by the coating 2*a* on the intermediate wall. When this twice-reflected light next impinges on the intermediate wall 2, about half of it passes through wall 2 into the outer annular space 5 and the remaining half is reflected again by coating 2*a*. The same thing happens at successive points along the intermediate wall 2 where the laser light impinges. As a result, the outer chamber 5 is filled with diffused laser light.

Six photodiodes or other photoelectric devices 10 are mounted on the outside of intermediate wall 2 in radial alignment with the respective openings 6 in the outer wall 1. These photodiodes are positioned to receive some of the laser light which is diffused throughout the outer chamber 5.

In accordance with the present invention, in its second embodiment, silver coated, light-reflective glass rods 11 are suspended inside the outer annular chamber 5 directly behind the respective openings 6 in outer wall 1. In one practical embodiment each glass rod is a cylinder about ¾ inch long and 1/16 inch in diameter which is fastened to thin upper and lower threads 12 and 13 which are held substantially taut. Each rod 11 is exposed to the diffused laser light in the outer annular chamber 5 and it reflects this light toward the photodiode 10 with which it is radially aligned.

Sound waves originating outside the housing and entering its six openings 6 causes the glass rods 11 to vibrate at the frequency of the sound waves. The vibrating glass rods 11 reflect laser light onto the respective photodiodes 10. The frequency of this reflected light as emitted by laser 7 is modulated by the vibrating glass rods 11 before impinging on the respective photodiodes, so that the instantaneous frequency of the laser light reflected to each photodiode from the corresponding rod 11 is determined by a carrier frequency emitted by laser 7 and a modulation frequency provided by the sound wave which causes the glass rod to vibrate. According to the Doppler principle, the frequency of laser light reflected from any vibrating rod 11 onto the corresponding photodiode 10 increases while the rod is in its half-wave of movement toward the photodiode and decreases while the rod is in its half-wave of movement away from the photodiode.

It will be apparent that when the glass rods 11 are vibrating in response to incoming sound, each photodiode receives laser light which is reflected from the vibrating glass rods 11 and therefore is frequency modulated by the incoming sound waves.

Each photodiode senses the frequency of the light and translates it into an electrical signal which is also frequency modulated and is proportioned to the velocity of the vibrating glass rod. At any given frequency of the incoming sound, the amplitude of displacement of the glass rod by the sound will be proportioned to the amplitude of the sound and the maximum velocity of the glass rod toward or away from the photodiode will be proportional to the amplitude of its displacement. Therefore, the frequency detected by the photodiode will vary in accordance with the frequency of the sound.

FIG. 4 shows one way of attaching the suspension thread 12 and 13 for each glass rod 11. The outer wall 1 of the housing is formed with an inwardly-projecting upper lug 14 located above each opening 6 and an inwardly-projecting lower lug 15 below the opening. The lower lug 15 is formed with a vertical opening having a downwardly facing semi-cylindrical recess 16 at the bottom and a conical passageway 17 which extends up from this recess and increases in diameter upward. The lower end of the lower suspension thread 13 is knotted and this knot abuts against the top of recess 16 around the intersection of the narrow lower end of passageway 17 with the recess 16. The upper lug 14 is formed with a screw-threaded vertical opening 18 which threadedly receives a nut 19 having a transversely enlarged head 20 on its upper end. Nut 19 is formed with a vertical passageway 21 through which the upper thread 12 extends snugly. The upper end of this thread is knotted and is seated in a semi-cylindrical recess formed in the top of the nut around the upper end of its passageway 21. By turning the nut 19, the tension on the upper and lower threads 12 and 13 may be selectively adjusted.

The mass of each silvered glass rod 11 and its suspension threads 12 and 13 is low enough to minimize inertia in the range of sound frequencies which the microphone is intended to reproduce.

If desired, the glass rod and threads may be replaced by a silvered thread or tape with its opposite ends anchored, permitting it to vibrate in response to the incoming sound at the corresponding opening 6 in the outer wall 1 of the microphone housing.

FIGS. 5 and 6 show a third embodiment of the present microphone. Elements of this third embodiment are given the same reference numerals plus 100 as those in the embodiment of FIGS. 1-4 so that the detailed description of these elements need not be repeated.

The outer annular chamber 105 located between the outer wall 101 and the intermediate wall 102 is filled with diffused laser light originating at a first laser 107 positioned in the inner annular chamber 104 between intermediate wall 102 and inner wall 103.

The laser 107 emits a coherent beam of light parallel to the top and bottom walls 108 and 109 and an oblique angle to a radius through the housing where the light first impinges on wall 103, so that light emitted from laser 107 is reflected repeatedly between the reflective wall coatings 102*a* and 103*a*.

Behind (i.e., radially inward from) each photodiode 110 is an opaque mask or barrier element 30 which absorbs the light emitted by laser 107 and passing through the intermediate wall 102 directly behind (i.e., radially inward from) the opaque mask 30. Each opaque mask 30 is so positioned as to prevent any of the laser light emitted by laser 107 from striking the corresponding suspended glass rod 111. Therefore, the laser light from laser 107 is not frequency modulated by the incoming sound. The part of light from laser 107 which does pass through the intermediate wall 102 between the opaque masks 30 impinges on reflective coatings 101*a* on the inside of outer wall 101 and is reflected onto the respective photodiodes 110. The reflective coatings 101*a* do not cover the entire inside surface of outer wall 101 but instead they are positioned to reflect onto the respective photodiodes 110 the light from laser 107 which is not absorbed by the opaque masks 30.

A second laser 32 is positioned inside the inner wall 103 of the housing and it emits laser light which is different in frequency from that of laser 107 by a small amount Δf, where Δf may typically be from 50,000 to 200,000 Hz, and which is transmitted through six optical fibers 33, each of which passes through the inner wall 103, the intermediate wall 102, and a corresponding opaque mask 30. In front (i.e., at the radially outward side) of each mask 30 the corresponding optical fiber 33 presents an exposed tip 34 which emits a laser light beam directly toward a corresponding suspended silver-coated glass rod 111, from which the light beam is reflected onto the corresponding photodiode 110.

With this arrangement, each photodiode receives simultaneously:

(1) light from the first laser 107, which is *not* modulated by sound coming in through the openings 106 in outer wall 101; and (2) second laser 32 which *is* frequency modulated by the vibration of the glass rods 111 at the frequency of the incoming sound.

Each photodiode 110 by optical photo-mixing senses the beat frequency between the unmodulated and modulated laser lights. The two lasers 107 and 32 may, as described above, operate at nearly the same frequency or at different frequencies so as to produce a constant beat frequency Δf at the photodiodes in the absence of incoming sound. This beat frequency would change, of course, in response to incoming sound in the manner already described, such that the frequency difference is frequency modulated by the velocity of the reflector.

The frequency modulated signal output from the photodiodes 110 is converted to an analog signal that corresponds in amplitude to the original sound waves in a frequency discriminating circuit, as shown in FIGS. 14*a* and 14*b*, and which is explained in greater detail below.

FIGS. 7 and 8 show a fourth embodiment of the present microphone having a housing with flat top and bottom walls 40 and 41 and a cylindrical side wall 42. A laser 43 mounted off-center on the top wall 40 and extending down from it directs a coherent beam of laser light onto a conical reflector 44 on the inside of bottom wall 41.

Six mirrors 45 are positioned at 60° intervals circumferentially around the inside of side wall 42 at the bottom of the housing to receive laser light reflected laterally from cone 44. Each of these mirrors is tilted at the correct angle upward and laterally outward to reflect the laser light laterally inward and upward onto a low-mass, thin walled silvered glass ball 46 suspended in the center of the housing by upper and lower threads 47 and 48.

From the glass ball 46 the laser light beams coming from mirrors 45 are reflected again, this time upward and laterally outward onto six photodiodes 49 mounted just inside the side wall 42 at the top of the housing at 60° intervals circumferentially.

The side wall 42 of the housing is formed with six circular openings 50 for passing sound into the interior of the housing to cause the suspended glass ball 46 to vibrate in harmony with the sound waves and thereby frequency modulate the laser light beams reflected from the ball onto the photodiodes 49 in accordance with the frequency of the incoming sound waves. As shown in FIG. 7, the openings 50 are located 60° apart circumferentially along the cylindrical side wall 42 of the housing. Each opening is midway between two mirrors 45.

FIG. 9 shows a variation of the above fourth embodiment of the present microphone which is identical to the embodiment of FIGS. 7 and 8 except that it has a suspended thin walled, low-mass silvered glass cylinder 60 or alternately a hexagonal prismatic low-mass reflective element in place of the glass ball 46 in FIGS. 7 and 8. Elements of the FIG. 9 microphone which are the same as those in the microphone of FIGS. 7 and 8 are given the same reference numerals plus 100.

FIGS. 10, 11 and 12 show a fifth embodiment of the invention having elements which duplicate those in the embodiment of FIGS. 7 and 8 and having the same reference numerals plus 200.

A first laser 243 directs light downward onto a first reflective cone 244, from which this light, as indicated by arrows A in FIG. 11, is reflected by six mirrors 245, located at 60° intervals circumferentially around the bottom of the housing, onto a thin-walled, low-mass silvered glass ball 246 suspended in the center of the housing. This ball reflects the light onto six photodiodes 249, located at 60° intervals circumferentially around the top of the housing.

As shown in FIG. 12, a second laser 70 extends up from the bottom wall 241 of the housing on the opposite side of the suspended ball 246 from the first laser 243 and reflective cone 244. The second laser 70 as shown by arrows B in FIG. 12 projects a coherent beam of light, whose frequency is slightly different from that of the light from laser 243, up toward a second reflective cone 71, which is on the bottom of the top wall 240 of the housing. Cone 71 reflects light directly to the six photodiodes 249, so that the frequency of the light originating at the second laser 70 and received by the photodiodes 249 is not affected by the sound-induced vibration of the suspended glass ball 246.

Thus, each photodiode receives unmodulated laser light from the second laser 70 and sound-modulated light of a slightly different frequency from the first laser 243 and mixes them photo-optically in a known manner to produce a beat frequency signal of a frequency Δf which is frequency modulated to the amplitude of the incoming sound, as already described.

If desired, the suspended glass ball 246 in FIGS. 10–12 may be replaced by a suspended, silvered, low-mass cylindrical glass rod 260, as shown in FIG. 13, or any other suitable reflective responding element.

FIG. 14*a* shows schematically how the photodiodes 10 may be connected to control the operation of a loudspeaker S having oppositely wound coils 26 and 28. The electrical output signals from photodiodes 10 are applied to a frequency-voltage converter 22 of any suitable design having a frequency to voltage conversion curve as shown in FIG. 14*b*, which produces an output signal whose voltage varies with the frequency of the incoming signal from photodiodes 10. For the embodiments shown in FIGS. 1–6 and 10–13, this frequency is the beat frequency between the unmodulated and modulated laser light beams impinging on the photodiodes. For the embodiment shown in FIGS. 7–9, this frequency is the frequency of the laser light which is frequency-modulated by the incoming sound. A voltage comparator 23 of any suitable design compares the output voltage from converter 22 with a fixed voltage from a reference voltage source 24.

When the output voltage from converter 22 increases above what it would be when the rods 11 are stationary, the voltage comparator 23 applies an "increase" signal through an amplifier 25 to one coil 26 in the loudspeaker S. Conversely, when the output voltage from converter 22 decreases below what it would be in the absence of any vibration of rods 11, the voltage comparator 23 applies a "decrease" signal through an amplifier 27 to coil 28.

The oppositely wound coil 26 and 28 are wound on a tube affixed to the usual vibratory, low mass cone of the loudspeaker S. The coils are positioned in a magnetic field whose lines of force project radially through each coil in a direction perpendicular to the coil axis (i.e., the axis of the tube on which the coil is wound). The energization of the first coil 26 tends to move the speaker cone in one direction whereas the energization of the second coil 28 tends to move the speaker cone in the opposite direction. The energization of the oppositely wound speaker coils vibrates the speaker cone back and forth at a frequency equal to that of the sound wave impinging on the reflective rods 11 and moving them toward and away from the respective photodiodes.

Figure 15:
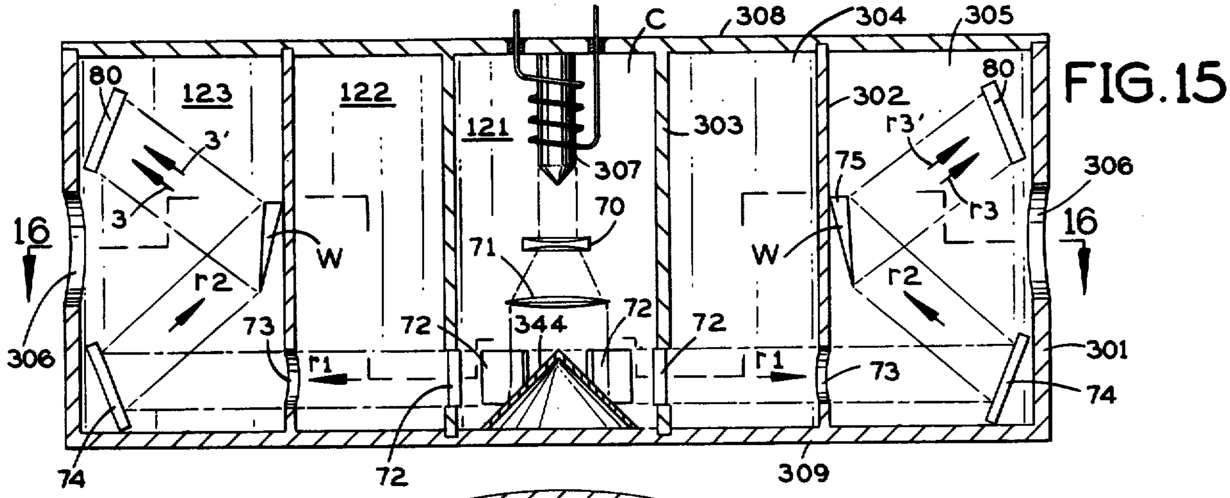
FIG. 15 is an elevational, cross-sectional view of an embodiment using Fizeau fringe detection.
Figure 16:
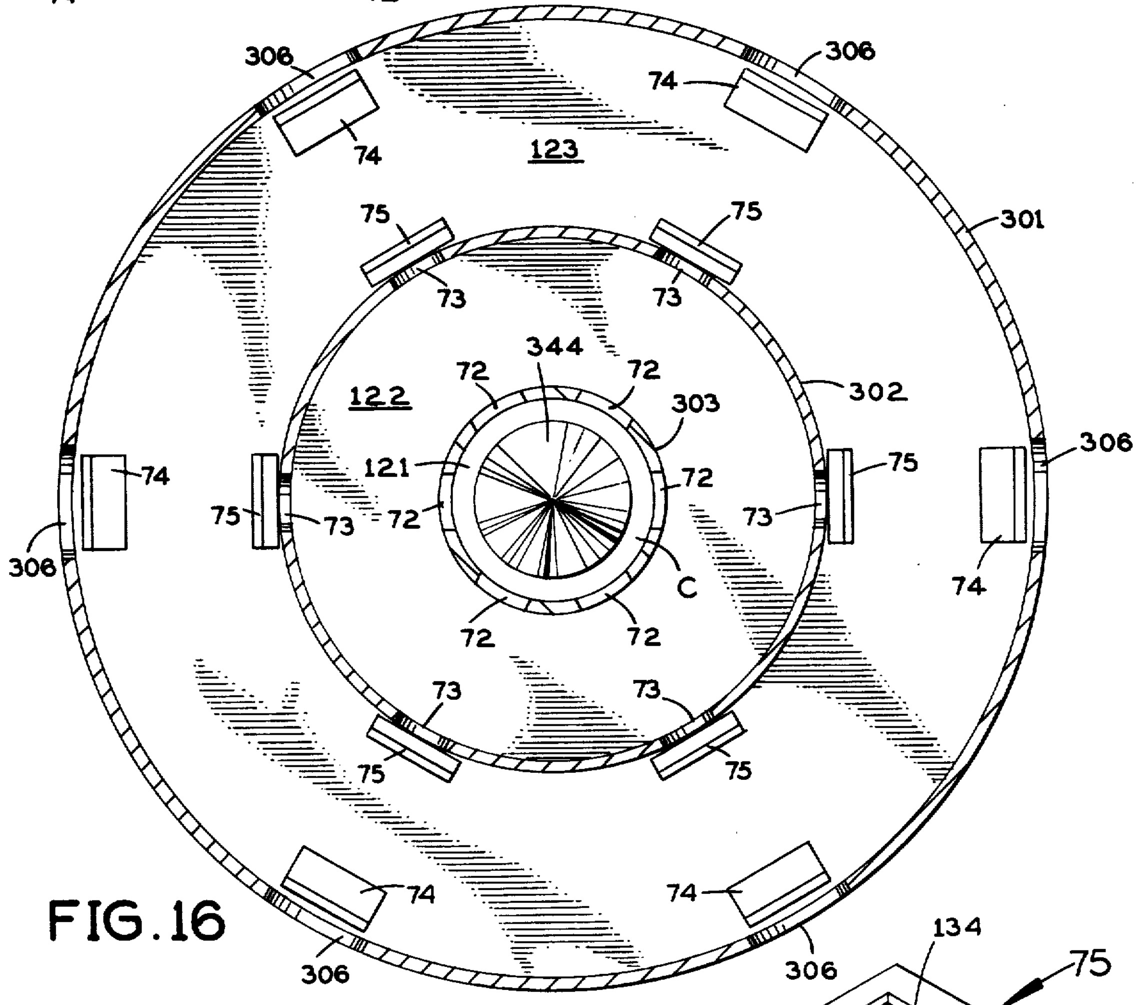
FIG. 16 is a horizontal, top-down cross-sectional view of the invention of FIG. 15 seen along the line 16—16 of that figure.
Figure 17:
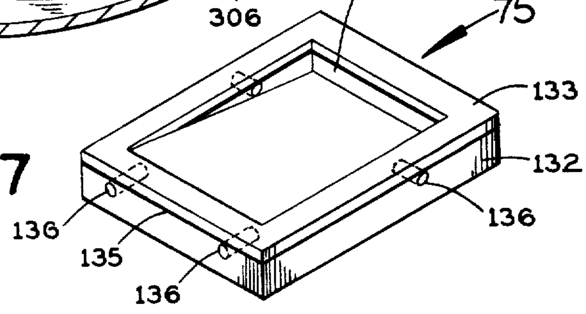
FIG. 17 is a perspective view of an air wedge as used in FIG. 15.

FIGS. 15 and 16 show a sixth embodiment of the invention based on the use of air wedges producing interference lines with a beam of laser light incident to the airwedge. The air wedge is constructed as shown in FIG. 17 and exposed to sound waves.

The microphone housing is constructed generally as the housing of the second embodiment of FIG. 1, 2 and 3, but with 300 added to the reference numbers of similar elements, to avoid repetitious description.

A centrally, axially positioned laser 307 is attached to the upper inner surface of the top plate 308 and is projecting a beam of laser light downward toward a circular reflecting cone 344 attached with its base to the inner, upper surface of the bottom plate 309.

The circular space between the circular top and bottom plate is divided into a cylindrical, inner space 121 surrounded by an annular space 122 defined as the space between the inner circular wall 303 and the intermediate circular wall 302, and an outer annular space 123 defined as the space between aforesaid intermediate circular wall 302 and the outer circular wall 301.

Interposed between aforesaid laser 307 and said reflecting cone 344 there is positioned an optional concave lens 70 next to the laser and a convex lens 71 positioned therebelow a suitable distance therefrom, said lenses serving to first expand the light beam to a large cross-section and then again to collimate the expanded beam to a cylindrical beam impinging on said reflective cone 344, from where the light is reflected as a horizontal, flat disc-shaped pattern of rays radiating from the axis of the cone.

Six equidistant rectangular apertures 72 are provided in the inner wall 303 and are so positioned that they admit six horizontal beams of light that travel through said intermediate space 122 and through 6 circular apertures 73 positioned in alignment with said beams in said intermediate circular wall 302, from where the beams as indicated by arrows r1 continue onto six mirrors 74, which are also aligned with said light beams r1.

The mirrors are positioned equidistantly around the circumference and in close proximity to said bottom plate and oriented such that the reflected beams are again projected as second reflected beams indicated by arrows r2 upward and inward to impinge on six air wedges 75 which are attached to said intermediate wall 302 approximately midway between said top and bottom plates.

The air wedges 75 are constructed in accordance with FIG. 17 which is a perspective view of a single air wedge.

The air wedge is a well known component used in experiments with light interference. It is here used as a basic Michelson Interferometer. It consists of a heavy base plate 132 made of a suitable material such as glass or the like, formed as a rectangular slab with a wedge-shaped cavity 134 ground into the upper surface of the slab. The lower surface of the cavity is coated with a mirror coating. The upper surface of the slab is covered with a thin flexible plate 133 that is coated on its outside surface with half transparent mirror coating, such that a light beam impinging thereon at an oblique angle is reflected as two beams, one from the mirror coating on the mirror surface of the wedge shaped cavity 134 and another beam from the half transparent mirror coating of the thin plate 133. The wedge shaped cavity is shaped with a very shallow angle which is typically a small fraction of a degree, but is, for the sake of clarity shown on the drawings with an exaggerated angle. The two third reflected beams are shown in FIG. 15 as arrows r3 and r3' and are projected onto a photo sensing diode 80. There are six equidistantly placed photo diodes 80 positioned circumferentially around the upper inner perimeter of the top plate 308. The photodiodes are of the position sensitive type explained earlier under the first embodiment, FIG. 21, but are oriented with their position sensitive axis in a vertical plane.

The third reflected beam, consisting of the two combined light beams r3 and r3' produces an interference pattern consisting of a series of horizontal equidistantly spaced interference lines, showing on the surface of the photodiodes as alternating dark and bright horizontal lines.

When there is no sound entering the microphone through the apertures 306, the interference lines remain stationary. If, however, sound waves enter the microphone, they impinge on the surface of the thin cover plates 133 of the air wedges which are set in vibration and which are in harmony with the sound waves.

As a result of the vibrations caused by the sound waves, the distance between the upper half transparent coating on the thin plate and the fully reflecting coating on top of the wedge shaped cavity will vary as a function of the sound pressure on the thin plate. As a result of the varying distance, one of the reflected beams r3' which is reflected from the thin plate will see its travelled distance, namely the distance to the thin plate and from the thin plate to the photodiode, vary slightly in harmony with the sound waves. This variation in distance causes the interference lines to move up and down while still remaining horizontal and separated generally by the same distance.

The air wedge is oriented and adjusted such that one of the bright lines falls precisely at the centerpoint of the light sensitive light axis of the photodiode, and the wedge is constructed so that the adjoining dark lines above and below said bright line are sufficiently separated in distance from said bright line that they never enter the surface of the photodiode, even under the largest excursions of the vibrating thin plate 133.

It follows that the thin plate 133 must be made of a very thin and flexible material which may be a thin film of a transparent plastic or glass-like material. A plurality of air channels 136 are disposed between the air filled cavity 134 and the surround ing air space.

These air channels serve to dampen the vibrations of the thin plate due to the air moving back and forth through the channels as a result of the vibrations, thereby causing dampening of the vibrations of the thin plate.

The number of fringes appearing on the surface of the wedge is a function of the light frequency and the angle between the pieces of the wedge. The most suitable plate angle for transducing sound waves may produce more fringes than can be easily processed electronically. The number of fringes at the angle may be reduced by reducing the light frequency, possibly by heterodyning as in other disclosed embodiments of the present microphone.

Figure 23:
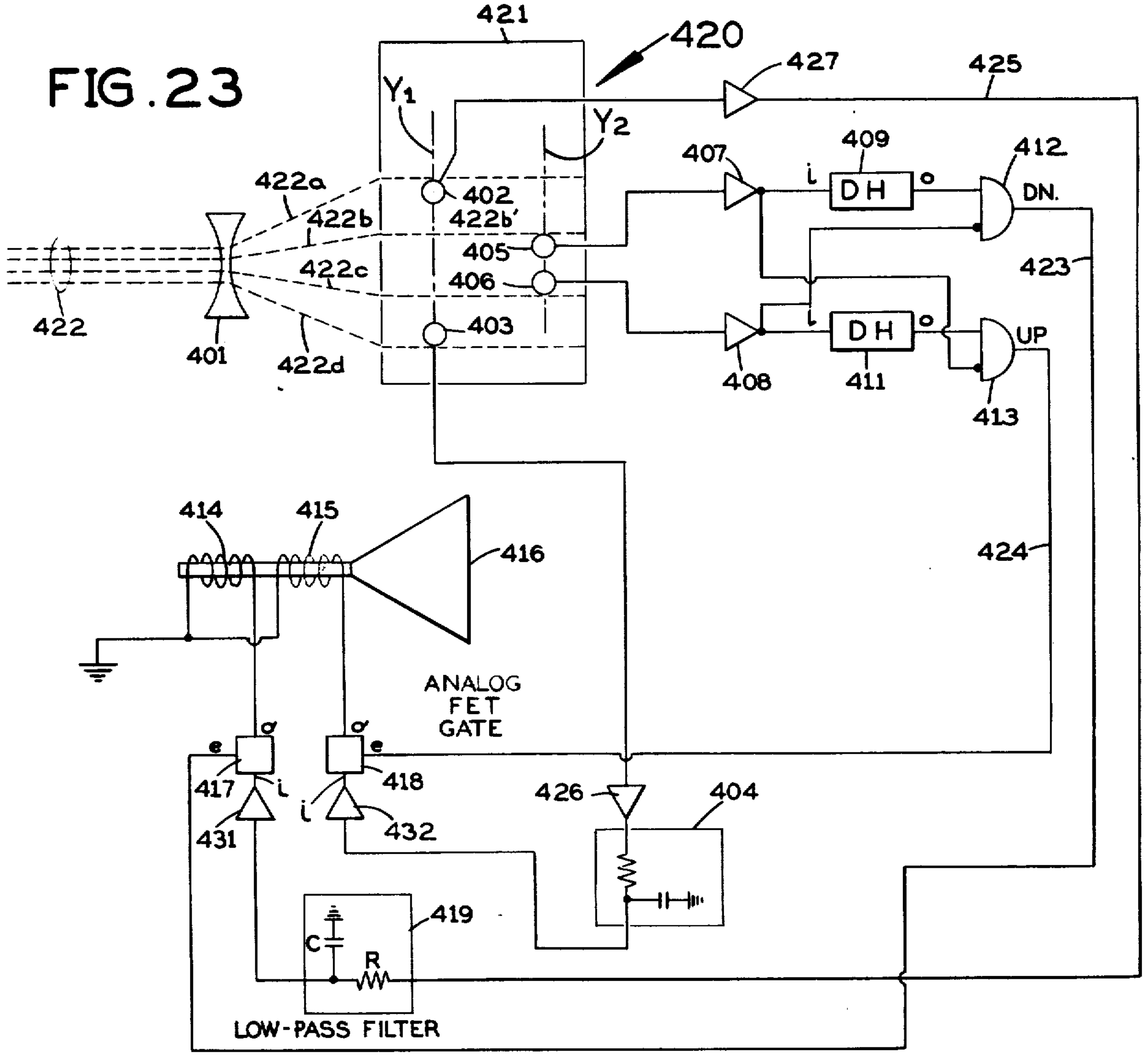
FIG. 23 is a schematic diagram of a modified embodiment using Fizeau fringe detection.
Figure 24:
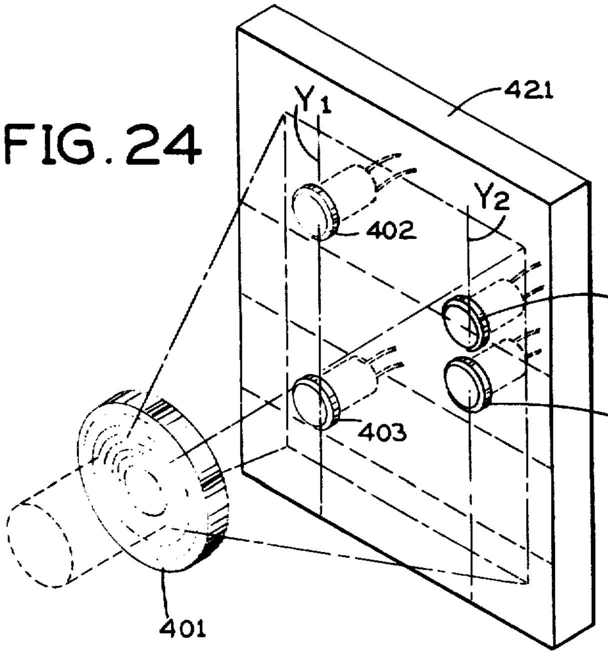
FIG. 24 is a fragmentary schematic perspective of the light detectors in FIG. 23.
Figure 25:
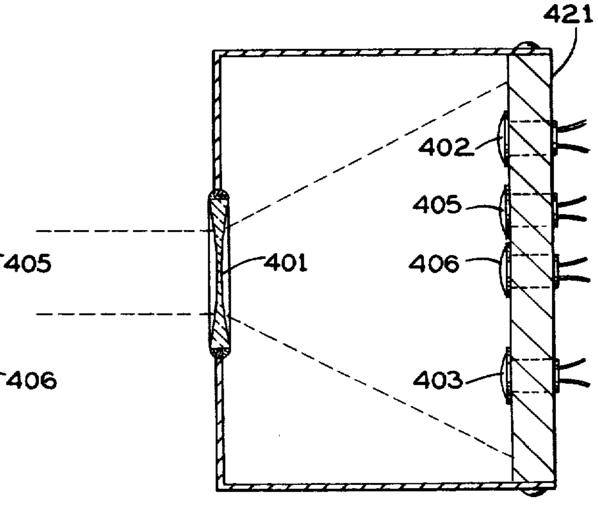
FIG. 25 is a vertical cross-sectional view of these light detectors.

In the foregoing description of the sixth embodiment of the present invention, a position sensitive photo detector has been used to translate the movements of the interference fringe pattern into a corresponding electrical signal that is correlated with the vibrations of the original sound waves. FIG. 23 shows a different, second method of translating an interference fringe pattern into a correlated signal. This method employs a motion sensitive photo detector 420 which is positioned generally in the same location within the microphone housing as the position sensitive photo detectors 80 in FIG. 15.

The motion sensitive photo detector 420 of FIG. 23 comprises a rectangular, vertically oriented base 421 supporting four photodiodes comprising the upper and lower photodiodes 402 and 403, respectively, disposed in a vertical line Y1 and upper and lower photodiodes 405 and 406, respectively, disposed more closely spaced in a vertical line Y2.

A laser light pattern of fringes is projected as rays of light by the aforesaid air wedge W, as shown in FIG. 15, onto the surface of the photo detector 420, as indicated by four broken horizontal lines 422 at the left side of FIG. 23. An optional concave lens 401 may be interposed in the path of the rays of light. This lens operates to spread the rays farther apart, as indicated by the diverging rays *422a*, *422b*, *422c* and *422d*, shown projected onto the surface of the photo detector 420 as four horizontal parallel broken lines.

The air wedge used in this variation of the microphone is constructed so that the pattern of light fringes consists of a plurality of horizontal alternating bright and dark lines. This requires that the angle of the air wedge be greater and its flexible plate more flexible than the air wedge in FIG. 15 or the top plate may alternatively be rigid and suspended in an elastomeric spacer.

As the flexible, upper plate of the air wedge in response to the sound wave pressure impinging thereon vibrates, the resulting pattern of horizontal fringe lines moves up and down across the surface of the motion sensitive detector 420. This motion is detected by the photodiodes 402, 403, 405 and 406 and the associated electrical components shown in the schematic circuit diagram of FIG. 23, as explained below. The two closely spaced photodiodes 405 and 406 together operate to detect the direction of motion of the fringe lines, while the two more widely spaced photodiodes 402 and 403 serve to detect the vertical velocity of the fringe lines.

The photodiodes 405 and 406 are connected to respective inverting amplifiers 407 and 408 which are in turn connected to respective delay-hold circuits 409 and 411, each with an input lead i and an output lead o. The delay-hold circuit's output lead o goes active the moment an input signal is presented to the input lead i and stays active for a preselected length of time, typically a fraction of a millisecond, depending on the system parameters, after the end of the input signal. The output lead o from each delay-hold circuit is connected to the upper input of a corresponding AND gate 412 or 413. The lower input to each AND gate is an inverting input. The inverting input to AND gate 412 is from the output of amplifier 408. The inverting input to AND gate 413 is from the output of amplifier 407.

Each AND gate 412 or 413 will produce an active output condition while its lower inverted input is nonactive and its upper input is active at the same time. The AND gate 412 presents an active condition on output lead 423 (DN) when the fringe pattern is moving downward due to the following reason: assuming a dark fringe line 422' just passed photodiode 405 in a downward direction, the resulting negative output pulse from the diode through inverting amplifier 407 would set the delay-hold circuit 409 on input lead i, its output lead o would go active and stay so for the duration of the delay time and enable the upper input to AND gate 412, while the lower inverted input to AND gate 412 would see an inactive condition from the output of amplifier 408. The output lead of AND gate 412 would go active and indicate a downward motion of the line pattern. Conversely, an upward movement would, in the same manner, activate first the photodiode 406, which would produce through the inverting amplifier 408 an active condition on the output of AND gate 413 which would indicate upward movement on lead 424. It follows that for successful operation the two photodiodes 405 and 406 must be closely spaced, in fact closer than a small fraction of the distance between two dark lines, and the delay-hold time of circuits 409 and 411 must be a little shorter than the shortest time interval of a line passing from one photodiode to the next.

The two photodiodes 402 and 403 serve to detect the rate of velocity with which the interference lines pass vertically across the motion sensing photo detector 420. Viewing first the upper photodiodes 402, as each dark fringe interference line passes across the face of the diode it develops a negative electrical pulse. An inverting amplifier 427 connected to the photodiode creates a pulse of opposite polarity. If the lines pass in rapid succession, indicating rapid movement of the upper thin flexible plate of the air wedge, the rapidly repeating pulses are connected to an integrating circuit in the form of a low-pass filter 419 consisting of a resistor R and a capacitor C. The greater the rate of repetition of the pulses to the low-pass filter 419, the greater its output potential. The lower photodiode 403 is connected via lead 426 to a similar low-pass filter 404.

The two low-pass filters 419 and 404 are connected via two linear amplifiers 431 and 432, respectively, to two analog gates 417 and 418, respectively. Each analog gate has a field-effect transistor with an input lead i, and output lead o, and an enable lead e which operates to provide a low resistance path between the input and output leads i and o when it is activated. The two analog gates connect their output signals to two opposing coils of a loudspeaker 416, which is identical to the two-coil loudspeaker S of FIG. 14*a*, and operates in the same manner.

In operation, when the interference pattern of lines from the air wedge moves upward, the AND gate 413 is activated and in turn enables, through analog gate 418, the output signal from low-pass filter 404 to operate coil 415, which in turn causes the speaker cone to move in one direction. The faster the pattern moves, the more the cone moves. Conversely, if the pattern moves downward, in the same manner, the coil 415 causes the cone to move in the opposite direction.

In the foregoing specification a number of embodiments of microphones according to the present invention have been described. They all depend on various methods of frequency modulating a beam of laser light with sound waves impinging on a low-mass reflecting vibratory component that is exposed to the sound pressure of the sound waves and thereby set in a vibratory motion which, in the various ways described, causes the laser light to be frequency modulated. Suitable apparatus for demodulating the frequency modulated sound waves are also described.

It should be understood that whenever the terms "vibration" or "vibratory" or the like are used throughout this specification, it denotes an oscillatory, damped movement as opposed to a freely oscillating, undamped movement, which would be undesirable in the present invention.

The microphones have all been disclosed in generally circular, planar configurations with a plurality of sound sensing openings each with associated sound detecting apparatus and each facing radially outward from the microphone. It should be understood, however, that the aforesaid plurality may as well where merited by the application be unity, in which case only a single microphone with sound detecting apparatus would be provided in one housing.

Figure 18:
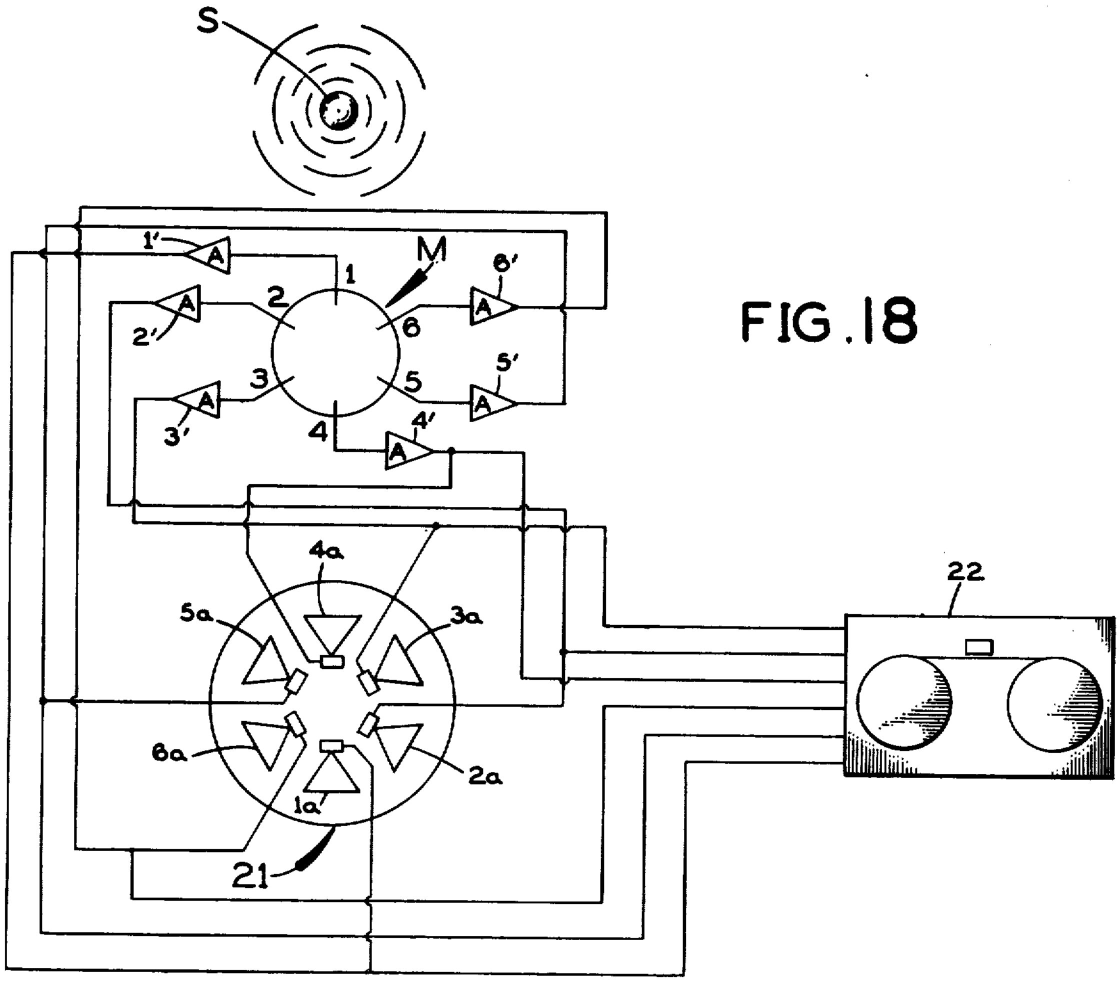
FIG. 18 is a schematic block diagram of the invention connected to loudspeakers and recording apparatus.
Figure 19:
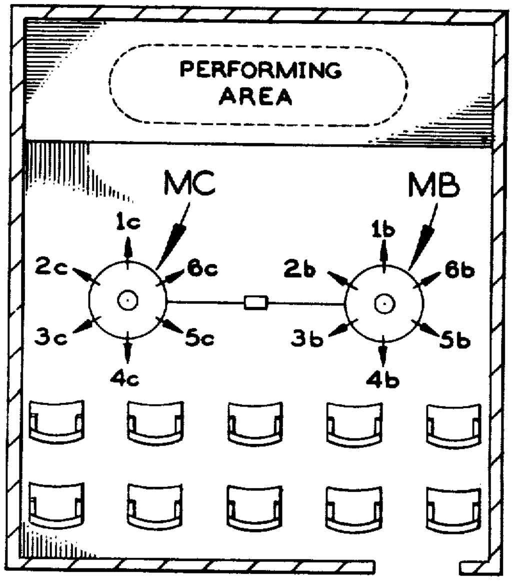
FIG. 19 is a view of the invention installed in a performing area.
Figure 20:
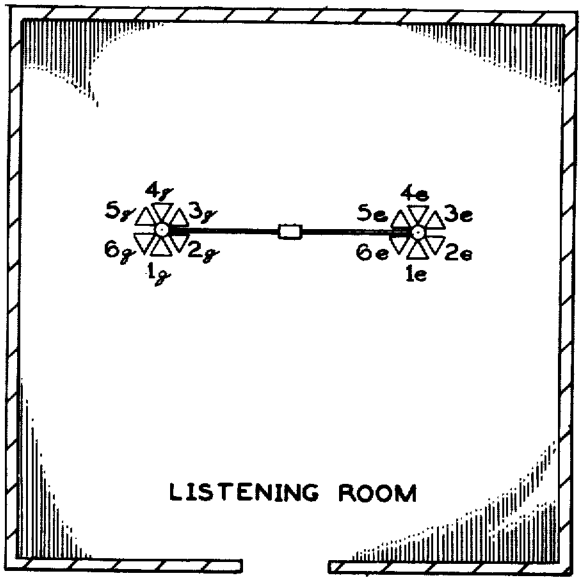
FIG. 20 is a view of a listening room with loudspeakers installed and connected to the invention.

The provision of a microphone equipped with a plurality of radially, horizontally outward facing sound sensing openings as disclosed does, however, provide the means for a sound reproducing system which is capable of providing a uniquely high degree of fidelity in sound reproduction when used in conjunction with suitably adapted and coordinated matching loud speaker clusters, as shown in FIGS. 18, 19 and 20.

This multichannel coordinated system of microphones and loud speakers has been described in a great deal of detail in my U.S. patent application, Ser. No. 06/355,898, filed Mar. 8, 1982.

In FIG. 18 a multi-channel microphone with six channels 1 through 6, seen from above and referenced generally as M is shown connected to a cluster of six loud speakers 1*a* through 6*a* through suitable amplifiers A, referenced 1' through 6'.

Each microphone channel will be producing signals in exact conformity with the shape of the incident air waves, such that the electrical signal produced by each of the six amplifiers 1',2',3' 4',5' and 6' in Fig. 18 is an exact reproduction of the incident sound waves generated by the sound source S. Each photo detector connected to the corresponding amplifier 1',2',3',4',5' or 6' which serves to amplify and process the signal for reproduction in a suitable loud speaker assembly 21 having six speakers 1*a*, 2*a*, 3*a*, 4*a*, 5*a* and 6*a*, or in a recorder 22 having six input channels. In the loud speaker assembly, each individual loud speaker (e.g., 1*a* or 2*a*) receives the amplified signal from the correspondingly numbered individual photodetector (e.g., 1 or 2) and broadcasts that signal, so that the overall effect approaches the realism of what a person would hear if positioned where the microphone M is in FIG. 3.

FIG. 19 shows two microphones MB and MC at laterally spaced locations in front of the performing area, such as for an orchestra, in an auditorium. Each of these microphones may be constructed in accordance with the embodiments disclosed, presenting six sound input openings at 60° intervals circumferentially in a horizontal plane and six corresponding photodetectors, numbered 1 through 6 for each microphone and with the "b" or "c" suffix for that particular microphone channel.

FIG. 20 shows two loudspeaker assemblies in a listening room. The first loudspeaker assemblies has a cluster of speakers 1*e*–6*e* spaced apart circumferentially at 60° intervals all facing outward. The speaker 1*e*, which faces in the opposite direction of the microphone channel 1*b*, receives the amplified signal from photodetector 1*b* in microphone MB in FIG. 19, and the speaker 2*e* receives the signal from photodetector 2*b*, and so on.

The second loudspeaker assembly in the listening room has a similar ring of speakers 1*g*–6*g*, with the correspondingly numbered speakers facing in the opposite direction and connected through amplifiers 1*c* through 6*c* to the corresponding numbered photodetectors in microphone MC in FIG. 19, e.g., speaker 1*g* is connected to photodetector 1*c*, and so on.

ADDITIONAL EMBODIMENTS

The low mass silvered sphere described in the fourth and fifth embodiments may instead be constructed as a sphere of an elastic sealed light reflective film containing a gas under a pressure slightly above atomospheric pressure.

A variation of the sixth embodiment uses an air wedge with 50% silver on the inside surface of the movable plate so that the Fizeau Fringe light phenomenon takes place on the inside of the air wedge in between the plates. The Fizeau Fringe lines are fringes that are only about 1/20th the width of the light area.

Movement of the top plate will change the angle between the plates and thus the distance between plates. As a result the fringe lines will move toward and away from the apex. There will be a moving train of thousands of Fizeau Fringe lines equally spaced but moving at greater or lesser velocity and one direction or the other according to movement of the top plate.

I claim:

1. A microphone comprising:

a housing having a substantially vertical axis and having a substantially cylindrical outer wall defining a substantially cylindrical planar cavity, bounded by the outer wall and a top and a bottom plate, the outer wall having a plurality of apertures disposed equidistantly around the outer wall, and serving to admit incoming sound waves into the cavity;

laser generator means disposed inside the cavity for generating laser light waves in the cavity;

sound wave-responsive means for reflecting the laser light, consisting of at least one low mass, flexibly suspended light reflecting element exposed to the incoming sound waves and for frequency modulating the laser light in accordance with the sound waves, and light-receiving means for receiving and operatively responding to the reflected frequency modulated light, disposed inside the cavity and serving for converting the laser light into electrical signals representing the incoming sound waves.

2. A microphone according to claim 1 and further comprising:

optical fiber light guide means operatively interposed between the laser generator means and the light reflecting means to project laser light from said laser generator means onto said sound wave-responsive means;

optical projection means including at least one optical prism operating to refract light reflected from said light-reflecting element into a diverging light beam sector and a concave lens for expanding said light beam sector;

and wherein said light-receiving means consists of at least one position-sensitive photodiode having a position-sensitive axis aligned with the direction in which the refracted light is expanded by said concave lens.

3. A microphone according to claim 2, wherein:

said sound wave-responsive means comprises a plurality of light reflecting elements, said plurality corresponding to said plurality of apertures, and each exposed to incoming sound at a corresponding aperture in the outer wall;

said optical fiber light guide means includes a plurality of optical fiber light guides, said plurality corresponding to said plurality of apertures, one for each light-reflecting element;

and wherein said photodiode means comprises a corresponding plurality of position-sensitive photodiodes, one for each prism and concave lens.

4. A microphone according to claim 3, further comprising at least one optical mask with an aperture therein disposed between each light reflecting element and the corresponding prism.

5. A microphone according to claim 1, wherein:

said housing has an intermediate wall spaced inward from said outer wall and defining therewith an outer chamber;

said housing has an inner wall spaced inward from said intermediate wall and defining therewith an inner chamber, said inner wall having a reflective outer surface;

said laser generator means is disposed in said inner chamber positioned to emit light obliquely toward said reflective outer surface of the inner wall;

said intermediate wall is constructed and arranged to pass some of the light reflected from said inner wall into said outer chamber and to reflect the remainder of said reflected light back toward said inner wall;

and said sound wave-responsive means and said light-receiving means for receiving the reflected laser light from said light reflecting means are both disposed in said outer chamber.

6. A microphone according to claim 5, wherein said outer wall of the housing has a non-reflective inner surface enabling said outer chamber to be filled with diffused laser light passing from said inner chamber through said intermediate wall into said outer chamber.

7. A microphone according to claim 6, wherein:

said sound wave-responsive light-reflecting means includes a corresponding plurality of light reflecting elements, each exposed to incoming sound at a corresponding opening in the outer wall and each exposed to diffused laser light in said outer chamber;

and said means to receive the reflected laser light has a corresponding plurality of photodiodes positioned to receive reflected laser light from the corresponding light reflecting elements.

8. A microphone according to claim 5, wherein:

said laser generator means comprises a second laser generator and optical fiber light guide means operatively coordinated with said laser generator means and arranged to direct light from said second laser generator onto said sound wave-responsive light-reflecting means for further reflection onto said light-receiving means, and further comprising means in said outer chamber for causing laser light emitted by said first-mentioned laser generator which passes into said outer chamber to strike said means to receive the reflected laser light without impinging on said sound wave-responsive light-reflecting means.

9. A microphone according to claim 8, wherein:

said sound wave-responsive light-reflecting means includes a corresponding plurality of light reflecting elements, each exposed to incoming sound at a corresponding opening in the outer wall;

said optical fiber light guide means includes a plurality of light guides operating to project light from said second laser generator onto said light reflecting elements;

and said means to receive the reflected laser light includes a corresponding plurality of photodiodes positioned to receive reflected laser light from the corresponding light reflecting elements.

10. A microphone according to claim 1, wherein:

said light reflecting element is flexibly suspended centrally with respect to said openings;

and said light-receiving means for receiving reflected laser light comprises a plurality of photodiodes, one for each of said openings, equidistantly spaced around the interior of said housing;

and further comprising:

a reflective cone positioned to reflect laser light emitted by said laser generator means;

and a plurality of mirrors spaced equidistantly around said cone to receive reflected laser light therefrom and to reflect the light onto said suspended light reflecting element for light reflection by the latter onto said photodiodes.

11. A microphone according to claim 10, wherein said laser generator means is a single laser generator.

12. A microphone according to claim 10, wherein:

said laser generator means comprises first laser and second laser generators, said first laser generator operating to project light onto said cone;

and further comprising:

a second reflective cone positioned to reflect laser light emitted by said second laser generator;

and a second plurality of mirrors equidistantly spaced around said second cone to receive reflected laser light therefrom, said second plurality of mirrors being operatively arranged to reflect laser light directly onto said photodiodes without striking said suspended light reflecting element.

13. A microphone according to claim 10, wherein said light reflecting element is a vertically suspended low mass sphere.

14. A microphone according to claim 10, wherein said light reflecting element is a vertically suspended low mass cylinder.

15. A microphone according to claim 10, wherein said light reflecting element is a vertically suspended, low mass, polygonal, prismatic element having a reflective side facing each of said mirrors and each of said photodiodes.

16. A microphone according to claim 1, wherein: said sound wave-responsive means comprises an air wedge having said flexibly suspended light reflecting element therein.

17. A microphone according to claim 1, wherein:

said outer wall has a plurality of equidistantly spaced openings leading into its interior;

said sound wave-responsive light-reflecting means comprises a corresponding plurality of air wedges positioned inside said housing opposite the respective openings, each of said air wedges having a flexibly suspended light reflecting surface therein;

and said means to receive reflected laser light comprises a plurality of position sensitive photodiodes, one for each of said air wedges spaced equidistantly around the interior of said housing to receive light reflected from the respective light reflecting surfaces of the air wedges;

and further comprising:

a reflective cone positioned to reflect laser light emitted by said laser generator means;

and a plurality of mirrors equidistantly spaced around said reflective cone to receive reflected laser light therefrom and to reflect the light onto the corresponding air wedges for reflection by the latter onto said photodiodes.

18. A microphone according to claim 17, and further comprising an interior wall of said housing extending around said reflective cone and having a plurality of rectangular openings aligned with the cone and respectively aligned with said mirrors to pass rectangular beams of light from the cone to the respective mirrors.

19. A microphone according to claim 18, and further comprising a concave lens and a convex lens spaced apart in succession between said laser generator means and said cone to first expand and then concentrate the beam of laser light emitted by said laser generator means before striking said cone.

20. A microphone according to claim 18, and further comprising a second interior wall of said housing extending between said first-mentioned intermediate wall and said mirrors, said second intermediate wall having a plurality of circular openings therein aligned with the respective mirrors and the corresponding rectangular openings in said first-mentioned interior wall.

21. A microphone according to claim 16, wherein said air wedge comprises:

a heavy base plate having a wedge-shaped cavity therein and a mirrored flat surface on the bottom of said cavity;

and a thin flexible plate extending across said cavity at a light angle to the latter's mirrored surface, said plate having a mirror coating thereon which is partially transparent to light to pass some of the incident light onto said mirrored surface of the base plate for reflection therefrom and to reflect the remainder of the incident light, said plate constituting the flexibly suspended light reflecting surface of said sound wave-responsive light reflecting means;

said mirrored surface on the base plate reflecting laser light which is unmodulated by incoming sound waves;

said flexible plate of the air wedge vibrating in response to incoming sound waves so that its mirror coating reflects laser light which coacts with the laser light reflected from said mirrored surface of the base plate to produce interference fringes of alternating dark and light intensity on said light-receiving means operating to receive the reflected laser light.

22. A microphone according to claim 17, wherein each of said air wedges, comprises:

a heavy base plate having a wedge-shaped cavity therein and a mirrored flat surface on the bottom of said cavity;

and a thin rigid plate extending across said cavity at a light angle to the latter's mirrored surface, said plate having a mirror coating on the inside thereof which is partially transparent to light to pass some of the incident light onto said mirrored surface of the base plate for reflection therefrom and to reflect the remainder of the incident light, said plate constituting the flexibly suspended light reflecting surface of said sound wave-responsive light reflecting means;

such that Fizeau Fringe phenomena occurs between the plates with resultant projection of Fizeau Fringe lines.

23. A microphone according to claim 16, further comprising a motion sensitive photo detector, said detector comprising four photodiodes, said photodiodes disposed in a plane generally parallel with the surface of said air wedge.

* * * * *